US007653668B1

(12) United States Patent
Shelat et al.

(10) Patent No.: US 7,653,668 B1
(45) Date of Patent: Jan. 26, 2010

(54) FAULT TOLERANT MULTI-STAGE DATA REPLICATION WITH RELAXED COHERENCY GUARANTEES

(75) Inventors: Radha Shelat, Pune (IN); Dilip Madhusudan Ranade, Pune (IN); Navin Kabra, Pune (IN); BijayaLaxmi Nanda, Orissa (IN); Anindya Banerjee, West Bengal (IN)

(73) Assignee: Symantec Operating Corporation, Mountain View, CA (US)

( * ) Notice: Subject to any disclaimer, the term of this patent is extended or adjusted under 35 U.S.C. 154(b) by 318 days.

(21) Appl. No.: 11/286,619

(22) Filed: Nov. 23, 2005

(51) Int. Cl.
*G06F 17/30* (2006.01)
(52) U.S. Cl. ................. 707/204; 707/203; 711/162; 709/201
(58) Field of Classification Search ............... 707/1, 707/10, 100, 201–204; 711/162; 709/201
See application file for complete search history.

(56) References Cited

U.S. PATENT DOCUMENTS

| 5,978,813 | A  | * | 11/1999 | Foltz et al. ............... 707/201 |
| 6,189,017 | B1 | * | 2/2001  | Ronstrom et al. ........... 707/204 |
| 6,625,623 | B1 | * | 9/2003  | Midgley et al. ............ 707/204 |
| 6,647,474 | B2 | * | 11/2003 | Yanai et al. ............... 711/162 |
| 6,826,182 | B1 | * | 11/2004 | Parthasarathy ............. 370/390 |
| 7,054,910 | B1 | * | 5/2006  | Nordin et al. .............. 709/208 |
| 7,191,284 | B1 | * | 3/2007  | Gupta et al. ............... 711/114 |
| 7,395,387 | B2 | * | 7/2008  | Berkowitz et al. .......... 711/162 |
| 2003/0033308 | A1 | * | 2/2003 | Patel et al. ................. 707/10 |
| 2004/0034822 | A1 | * | 2/2004 | Marchand ................... 714/712 |
| 2005/0289193 | A1 | * | 12/2005 | Arrouye et al. ............ 707/200 |
| 2006/0123406 | A1 | * | 6/2006 | Sudhi et al. ................ 717/168 |
| 2006/0259468 | A1 | * | 11/2006 | Brooks et al. ............... 707/3 |

OTHER PUBLICATIONS

"Ivy: A Read/Write Peer-to-peer File System"; Muthitacharoen, Fifth Symposium on Operating Systems Design and Implementation (OSDI); Boston, MA. Dec. 2002.
OceanStore: An Architecture for Global-Scale Persistent Storage; Kubiatowicz, et al; Proceedings of ACM ASPLOS, Nov. 2000.

* cited by examiner

*Primary Examiner*—Pierre M Vital
*Assistant Examiner*—Christopher J Raab
(74) *Attorney, Agent, or Firm*—Meyertons, Hood, Kivlin, Kowert & Goetzel, P.C.

(57) ABSTRACT

A system for fault tolerant multi-stage data replication with relaxed coherency comprises one or more processors and memory coupled to the processors, where the memory stores program instructions executable by the processors to implement a data replication service. In response to an update request directed at a data object, in a first stage of replication, the data replication service is configured to update respective primary replicas at a plurality of primary replica sites for the data object, and to store metadata descriptors at each of the plurality of primary replica sites. The data replication service is configured to determine whether a notification of the update is to be sent to any other replica sites. In response to identifying such other replica sites, an update notification including contents of a metadata descriptor may be sent to the other replica sites in one or more additional replication stages.

26 Claims, 9 Drawing Sheets

Descriptor 120

| Transaction ID 405 | Data Object Version Number 410 | Intent Information 415 (E.g., Offset, Modification Length) | Additional Metadata/ Statistics 420 |

FIG. 4

Replica Attributes 505

| Unique Object ID 510 | Role 515 (e.g., PR/LSR/ RR/RSR) | Parent/Sibling Node Identifiers 520 | Last Coherent Timestamp 525 | Lagging Replicas List 530 |

FAULT TOLERANT MULTI-STAGE DATA REPLICATION WITH RELAXED COHERENCY GUARANTEES

BACKGROUND OF THE INVENTION

1. Field of the Invention

This invention relates to computer systems and, more particularly, to multi-stage file replication techniques within distributed data management systems.

2. Description of the Related Art

Business data for large corporations and government entities is often spread across multiple physical locations and data centers. A given enterprise company may employ tens of thousands of employees around the world, distributed across tens or hundreds of offices. Many employees from different locations often have to access and/or update the same underlying data, some of which may have to be obtained across relatively slow network connections such as wide area networks (WANs), metropolitan area networks (MANs), and the like. The problem of designing scalable large scale distributed data management systems to support today's distributed enterprises is becoming even more complicated as the total amount of enterprise data rapidly increases to terabyte levels, while continuing financial constraints and industry-wide trends to become more standards-compliant restrict the ability to, for example, deploy proprietary or customized high-speed networks and/or protocols.

One common approach used for data sharing across long distances is to replicate data locally: e.g., in a distributed software development environment with several software engineering sites, data objects such as source code files, design documents, status documents etc. may be replicated at each of the several sites. The volume of the data to be shared, especially when combined with high frequency of updates and large numbers of potential replication sites, however, may make brute-force replication of the needed data impractical. Traditional data replication systems may suffer from various types of limitations. For example, traditional replication schemes involving synchronous replication of files being updated may not be appropriate when the synchronous replication has to be performed over slow wide area network links. Some replication schemes may be too centralized for large scale systems spread over hundreds or thousands of servers and workstations: e.g., if a single server is responsible for propagating updates to a given file across the entire network, the server may quickly become a performance bottleneck and/or an availability risk. Replication schemes that attempt to maintain strict replica coherency, e.g., schemes that require that only the single latest version of a replicated data object be accessed at all replication sites, may also not scale well in large networks, since coherency-related traffic may potentially dominate the network linking the sites, and coherency-related delays may significantly affect user response times. The problem of efficiently providing the data needed at various sites in distributed data management systems with reasonable levels of performance is non-trivial even under normal operating conditions, e.g., in the absence of errors and failures. The requirement to respond effectively to failures such as transient or long-lasting system and network outages, which may, for example, potentially result in a disruption of an ongoing replication data stream, or in a node of a cluster becoming unavailable for hours, only complicates the problem further.

Techniques used to alleviate one class of problem in large-scale distributed data management may sometimes tend to aggravate other classes of problems—e.g., increasing the number of replication sites for a file in an effort to reduce access latencies may require extra work for maintaining coherency among the newly added replicas. Large-scale distributed data management systems that employ replication may therefore have to take into consideration various tradeoffs between potentially conflicting goals such as high performance, replica coherency, high availability, and ease of use.

SUMMARY

Various embodiments of systems and methods for fault tolerant multi-stage data replication with relaxed coherency guarantees are disclosed. According to one embodiment, a system comprises one or more processors and memory coupled to the processors, where the memory stores program instructions executable by the processors to implement a data replication service. In response to an update request directed at a data object of a distributed data management service (such as a distributed file system spread over hundreds or thousands of nodes), in a first stage of replication the data replication service is configured to update respective primary replicas at a plurality of primary replica sites for the data object, and to store metadata descriptors at each of the plurality of primary replica sites. The primary replicas may be updated, and the metadata descriptors stored, within a single distributed transaction which may be synchronous with respect to the update request in some embodiments: e.g., a response indicating completion of the update may not be sent to client that requested the update until the primary replicas have been updated and the metadata descriptors have been stored. The metadata descriptors, may, for example, comprise intent information on the update, such as the offset within a file at which the update is targeted and the number of data blocks or bytes updated starting at that offset, as well as a version number corresponding to the update. A number of nodes of the distributed data management service may be designated as primary replica sites for a given data object, and participation by a quorum or majority of the designated replica sites may be required for the update transaction to succeed.

After the first stage of replication is completed, the data replication service may be configured to determine whether a notification of the update is to be sent to any other replica sites; if one or more such replica sites are identified, an update notification including at least some of the contents of the metadata descriptor may be sent asynchronously to the other replica sites in a second stage of replication. On receiving an update notification, a replica site may invalidate the portions of the local replica that were updated, and may in some embodiments send a request to one of the primary replica sites for the modified data blocks. In other embodiments, the modified data blocks may be eventually pushed to the non-primary replicas from primary replica sites, e.g., even if no requests for the specific modified data blocks are received at the primary replica sites. Non-primary replicas may not necessarily include copies of the entire data object; e.g., in some embodiments one or more non-primary replicas may be sparse replicas that only contain copies of those blocks to which access was requested at the local node. Each non-primary replica may serve as a cache enabling quick access to the portion of the data object that is accessed locally at the corresponding replica site. By ensuring that multiple copies of the data object are updated in persistent storage before the update completion indication is sent to the update requester, the data replication service may ensure that data corresponding to a completed update cannot be lost due to a single failure. By decoupling the notification of updates to non-primary replica sites from the synchronous transaction using multiple replication stages, the data replication service may trade off strict coherency for performance: e.g., while older versions of the data may potentially be accessible at non-primary replica sites for short amounts of time, the amount of traffic generated for coherency may be substantially reduced compared to environments where all replicas have to be updated synchronously. The multi-stage loosely-coupled replication techniques supported by the data replication service may be used in any of a variety of storage management applications in different embodiments, including large-scale distributed file systems, multi-tier backup architectures, etc.

In some embodiments, the data replication service may be configured to include one or more modified data blocks changed by the update in the notification messages. For example, a configuration parameter may specify that if the amount of data modified by the update request is less than a threshold value (e.g., two kilobytes or four kilobytes), the modified data blocks may be included in the notification message. Each update may result in a new version number being generated for the data object in some embodiments, and the version numbers may be used at replica sites receiving update notifications to determine whether any updates have been missed. For example, if a given replica site has version number 20 of a given file, and an update notification with a version number 24 is received at the site, the data replication service at the receiving site may deduce that versions 21, 22 and 23 were missed or lost, and may send a request to a primary replica site for the missing version. In some embodiments, each site that maintains a replica of a given data object may also maintain a "last coherent timestamp" associated with the object. The last coherent timestamp may indicate when the site last participated in an update transaction (in the case of primary replica sites) or last received an update notification message (in the case on sites that store non-primary replicas). If a sufficiently large amount of time (e.g., an amount determined by a configuration parameter) has elapsed since the time indicated by the last coherent timestamp at a give node, the node may send a request to a primary replica site to synchronize with the latest version of the data.

BRIEF DESCRIPTION OF THE DRAWINGS

FIG. 4 is a block diagram illustrating exemplary contents of a particular metadata descriptor within a history log, according to one embodiment.

FIG. 5 is a block diagram illustrating various replica attributes for which values may be maintained at each node that stores a replica, according to one embodiment.

Figure 1:
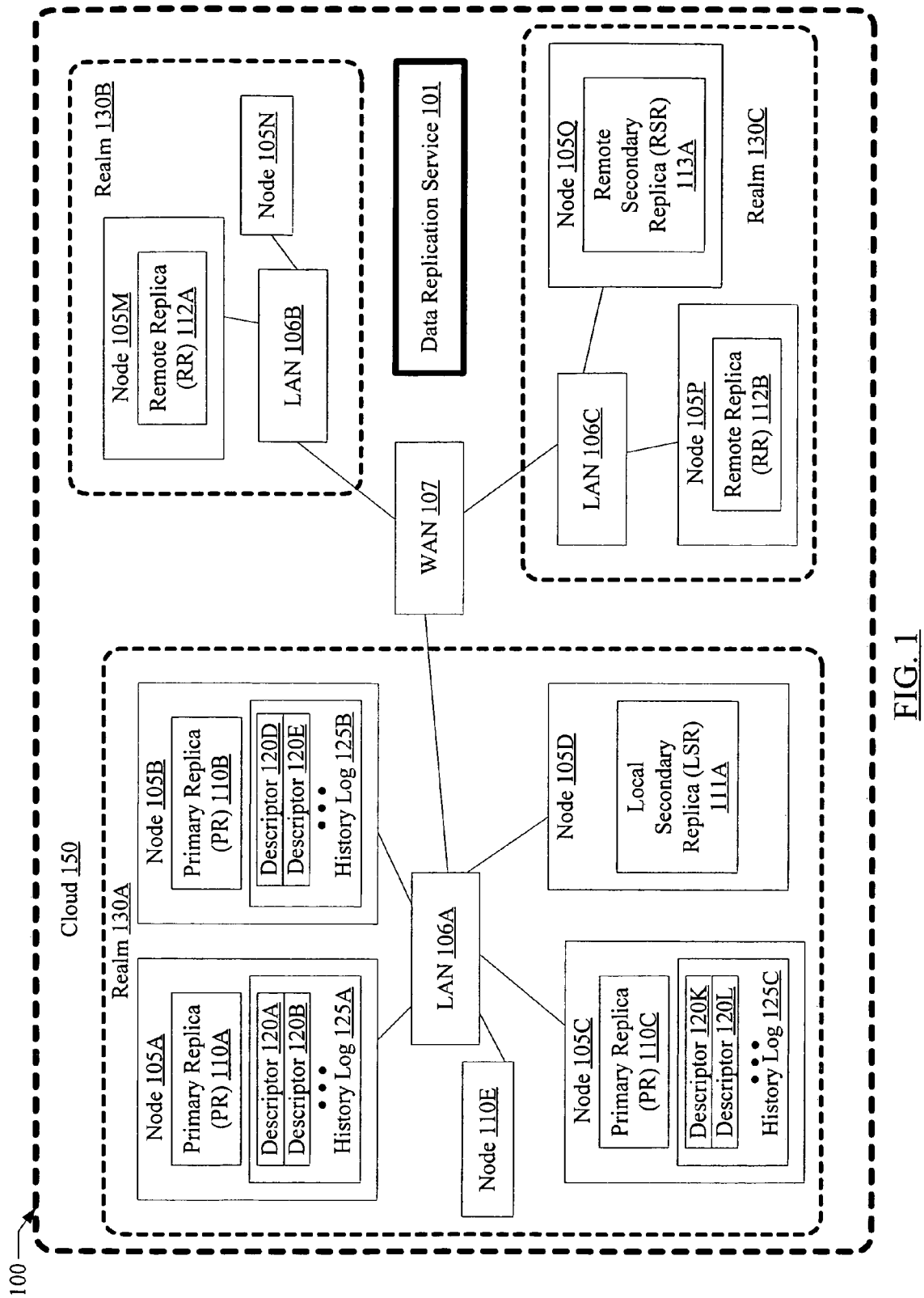
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a plurality of nodes 105 (such as nodes 105A-105E, 105M, 105N, 105P and 105Q) linked in a hierarchical configuration using local area networks (LANs) 106 (e.g., LANs 106A-106C) and wide area network (WAN) 107. Each node 105, may, for example, comprise a computer host or server with one or more processors, memory, storage devices such as disks or disk arrays, and a network interface card. At least a subset of the storage devices at each node may be accessible only from that node in some embodiments. A set of nodes that are linked to one another via a particular LAN 106 may be termed a "realm" 130; e.g., realm 130A comprises nodes 105A-105E linked via LAN 106A, realm 130B comprises nodes 105M and 105N linked by LAN 106B, and realm 130C comprises nodes 105P and 105Q linked via LAN 106C. The set of realms 130 in a given instance of the system 100 may be termed a "cloud" 150. In the depicted embodiment, realms 130A, 130B and 130C are linked to one another via WAN 107. High bandwidth and low latency communication may typically be supported among the nodes 105 in any given realm 130, while in some implementations inter-realm communication between at least some realms 130 in cloud 150 may have to be performed over relatively slow, low-bandwidth links. The system 100 includes a data replication service (DRS) 101 configured to replicate selected data objects among various nodes, as described below in further detail. Components of DRS 101 may be resident at each node 105 in some embodiments. In one embodiment, the DRS 101 may be part of a more general distributed data management system, which may include other services such as data object location and discovery services, distributed transaction management services, etc. as described below in conjunction with the description of FIG. 7, and each node 105 may be configured to execute various modules of the distributed data management system. Various types of data objects, such as files, directories, and symbolic links may be managed using a single global name space in system 100, so that, for example, a file may be accessed seamlessly using the same identifier from any node 105. It is noted that although only a few realms 130 and only a few nodes 105 per realm are shown in FIG. 1, the system may include dozens, hundreds or even thousands of realms, and tens of thousands of nodes in various embodiments.

Multiple physical copies (potentially including both full and partial copies) of various data objects may be maintained in system 100 using DRS 101, for example to provide high availability and to support fast data access. Each copy may be termed a replica of the data object. In one embodiment, when a data object such as a file or a directory is created, two or more nodes 105 may be designated as primary replica (P-replica or PR) sites for the object. For example, in FIG. 1, primary replicas 110A, 110B, and 110C of a particular data object are shown at nodes 105A, 105B and 105C respectively. In the depicted embodiment, all P-replicas of a given data object are confined to a single realm 130, which may be termed the "parent realm" of the data object herein. In other embodiments, P-replicas of a given object may be distributed across two or more realms. Primary replicas of a given data object are expected to be updated synchronously whenever the object is updated in the depicted embodiment: e.g., in response to an update request from a client, an attempt to update each of the P-replicas of the object may be made. If at least a quorum (e.g., a majority) of the P-replicas is successfully updated, a response indicating that the update completed may be returned to the client. Non-primary replicas, i.e., replicas that may be typically updated asynchronously with respect to the update request, may also be maintained at various nodes 105 in some embodiments. For example, within the parent realm 130A, one or more other nodes such as node 105D may maintain a local secondary replica (LSR) 111A of the object. Within other realms (i.e., realms that are not the parent realm of the data object), one or more remote replicas (RRs) 112 and remote secondary replicas (RSRs) 113 may be maintained, such as remote replica 112A at node 105M, remote replica 112B at node 105P and remote secondary replica at node 105Q. Local secondary replicas 111, remote replicas 112 and remote secondary replicas 113 may be collectively referred to herein as "non-primary" replicas, and nodes 105 where non-primary replicas are stored for a given data object may be referred to herein as non-primary replica sites for that object.

Non-primary replicas may be created for a variety of reasons in different embodiments. Remote replicas 112 and remote secondary replicas 113 may be created, for example, in response to access requests directed at the data object from their local nodes 105, so that locally received data access requests (such as reads) may be processed more efficiently than if the data always had to be retrieved over a potentially slow WAN 107. An RR 112 or an RSR 113 may not be a complete copy of the underlying data object in some embodiments; for example, only those specific data blocks of a file to which access is requested from a given node 105 may be replicated locally in an RR or an RSR. Such incomplete replicas, which may contain a subset of the data blocks of the corresponding P-replicas, may be termed "sparse" replicas herein, and the data blocks missing from a sparse replica (i.e., the data blocks that are not replicated locally) may be termed "holes" within the sparse replica. Remote replicas 112 and remote secondary replicas 113 may thus serve as caches of those portions of the data objects to which access is requested locally. RRs 112 may differ from RSRs 113 in some embodiments in that within a given realm 130, an RR 112 may be notified of an update first, and then the RR may in turn be configured to propagate the update to any RSRs 113 in that realm, as described below in further detail. Local secondary replicas 111 may be created, for example, to further increase redundancy and thereby enhance the ability to withstand failures at P-replica nodes, and may also be created in response to local access requests in some embodiments. LSRs 111 may be either full replicas or sparse replicas in various embodiments. Nodes where non-primary replicas are created may be configured to register for notification of updates to the replicated data object, so that, for example, DRS 101 may be able to determine where updates need to be propagated.

In the embodiment depicted in FIG. 1, DRS 101 may be configured to update at least a quorum (e.g., a majority) of the P-replicas within a single distributed transaction that supports standard transactional ACID (atomicity, consistency, isolation and durability) properties. By updating multiple P-replicas within the transaction, DRS 101 may ensure that at least two copies of the updated data blocks are stored in persistent storage, so that a failure of a single node 105 (or any other single failure) does not lead to a loss of the updated data. By including at least a quorum of the P-replica sites in the transaction, DRS 101 may ensure consistency in the face of network partitioning failures (e.g., failures that might lead to so-called "split-brain" events within a parent realm of the data object being updated). At the same time, by limiting the number of nodes 105 that participate in the transaction, DRS 101 may ensure that updating clients do not experience excessive latencies for operations such as writes and creates.

For each P-replica 110 of an object, DRS 101 may also be configured to maintain a respective history log 125 comprising metadata descriptors of recent changes: e.g., history log 125A may be maintained for P-replica 110A, history log 125B for P-replica 110B, and history log 125C for P-replica 110C. In addition to updating the data of the P-replicas, DRS 101 may also store a descriptor 120 at each history log 125 corresponding to an updated P-replica in response to the update request. The metadata descriptors 120 may comprise, for example, update intent information (such as an offset within a file and an indication of the number of bytes modified starting at the offset for a file update, or updated block numbers for a directory update), a version number, and/or a transaction identifier in various embodiments, and may be used to efficiently propagate updates to non-primary replica sites without necessarily transmitting all the updated data blocks, as described below in further detail. For example, in one implementation, if RRs 110A and 110B are updated within a given distributed transaction (e.g., since nodes 105A and 105B form a quorum of the set of designated P-replica sites 105A, 105B and 105C for the underlying data object), a metadata descriptor 120A for the update may be stored in history log 125A within the same transaction, and a metadata descriptor 120D for the update may also be stored in history log 125B within the same transaction. History logs 125 as well as local replicas at each participating node may be stored in persistent storage. In some embodiments, the replicas as well as the history logs may be stored on non-shared storage devices, i.e. on storage devices that are directly accessible only from a single node 105.

DRS 101 may be configured to guarantee synchronous replication of an update to persistent storage at multiple P-replica sites (i.e., an update may be designated as completed only if multiple P-replicas have been successfully updated) in some embodiments. DRS 101 may also be configured to make a best effort to propagate the update as soon as possible to other replica sites that may have registered to receive update notifications; however, at any given time the replicas at various non-primary replica sites may not be identical (i.e., only a loose level of coherency may be maintained for non-primary replicas), and DRS 101 may provide no guarantees on how long it may take for a given non-primary replica to "catch up" with the synchronously updated P-replicas in such embodiments. The updates of the P-replicas and the history logs 125 may thus form a synchronous first stage of a multi-stage replication process in some embodiments, in which the remaining stages may be asynchronous with respect to the first stage and/or with respect to each other. In some embodiments, timeout based mechanisms may be used to ensure that updated data blocks eventually reach the non-primary replica sites where they are needed: e.g., if DRS 101 detects that a non-primary replica site has not received any updates for a threshold amount of time, a synchronization of the non-primary replica with the latest version of the P-replica may be initiated, as described below in further detail. It is noted that non-primary replicas may be concurrently accessed while update transactions are performed on P-replicas (and while update notifications are being generated or in transit), i.e., data access requests directed at the replicated data object may be handled using slightly older versions of the data from non-primary replicas.

After updating the P-replicas 110 and storing the metadata descriptors 120 in the corresponding history logs 125 for a given update request, DRS 101 may be configured to determine whether any other nodes 105 are to be notified of the update. If one or more other nodes 105 that store non-primary replicas of the same data object are identified, DRS 101 may be configured to send a notification of the update to the one or more other nodes from one or more P-replica nodes, e.g., in the form of a message including at least the update intent information stored in the descriptor 120 for the update. When a node receives the update notification, the portions of its local replica that correspond to the updated blocks may be invalidated in some embodiments. Not all the contents of a metadata descriptor may be included within a notification message in some embodiments: e.g., in some embodiments, the descriptor may include a transaction identifier which may not necessarily be included in a notification update to a non-primary replica. By sending a limited amount of metadata such as intent information, instead of always sending the updated data to other replica sites, DRS 101 may reduce the load placed on the network and the nodes 105, while still enabling fast invalidation of stale versions of the updated data. The transmission of the notification message or messages may be asynchronous with respect to the updates of the P-replicas 110 in some embodiments; e.g., the client that initiated the update request may be informed that the update has succeeded before any notification message is sent. The specific P-replica node or nodes from which the notification messages are sent may be selected using different algorithms in various embodiments, as described below in further detail in conjunction with the description of FIG. 2 and FIG. 3. The asynchronous propagation of the update notification to one or more non-primary replica sites may form a second stage of the replication process. Additional stages of replication may be implemented in some embodiments, e.g., after remote replicas 112 are notified in a second stage of replication, remote secondary replicas may be notified in a third stage of replication, etc.

In some embodiments, some or all of the data blocks modified as a result of the update may also be included in an update notification message. For example, in one implementation modified data blocks may be included if the total amount of data modified in an update is less than a specified threshold: e.g., if less than 2 Kilobytes of data is modified in a particular update, the modified version of the data may be included in a corresponding update notification message, and if more than 2 Kilobytes of data is modified, the modified data blocks may be propagated later or in response to a demand for the modified data from a non-primary replica site. The threshold size may be specified via a configurable parameter to DRS 101 in some embodiments, and may be chosen heuristically by DRS 101 in other embodiments (e.g., based on an estimate of current network latencies between primary and non-primary replica sites, a measured level of congestion in a LAN or WAN, etc.).

As noted above, in response to receiving an update notification at a node where a non-primary replica is maintained, DRS 101 may be configured in one embodiment to invalidate the portion of the local replica that corresponds to the update. For example, if an update notification includes intent metadata indicating that a file was N bytes of a file were update starting at offset O, the DRS 101 at the receiving node may mark the corresponding portion of the local replica (e.g., using a bit map or some other data structure) as being invalid, so that responses to subsequent requests to access that portion of the file at the receiving node do not provide stale data to the requesters. In some embodiments, the P-replica node from which the update notification message was sent may later also send the modified data corresponding to the update in one or more data messages to each node where an update notification was sent. Only the changed data blocks may be propagated in some embodiments, instead of, for example, propagating the entire file. In one implementation, modified data blocks corresponding to multiple updates may be bundled into a single message for more efficient transmission to non-primary replica sites. In other embodiments, the receiving node may send a data request to the P-replica node from which the update notification was sent, e.g., in response to a client access request for the invalidated portion of a file, and the P-replica node may send the modified data in response to the data request. Eventually, using either a data push strategy (where the P-replica site initiates the transmission of modified blocks), a data pull strategy (where the non-primary-replica site requests the P-replica site to send the modified data), or a combination of data push and data pull strategies, the modified data blocks may be replicated at each non-primary replica site where the data is required. By implementing loose coherence and lazy and/or demand-driven propagation of modified blocks in combination with transactional and synchronous multiple P-replica updates as described above, DRS 101 may reduce the overall performance impact of coherency-related traffic in system 100, while ensuring that updated data is not lost due to a single point of failure.

In one embodiment, if a P-replica site from which an update is to be propagated to a non-primary replica site fails before the update notification and/or the updated data blocks are successfully sent to the non-primary replica site, one or more other P-replica sites may be selected by DRS 101 to take over the task of update propagation. In another embodiment, after a given P-replica site completes its update propagation for a particular update, e.g., by pushing the updated data blocks to one or more non-primary replica sites, the other P-replica sites may be notified that the update propagation is complete, and any in-memory state maintained at the other states for that particular update may be discarded.

In some embodiments, version numbers may be maintained for data objects, so that, for example, each successful update request results in a change to the version number of the object (e.g., the version number may be incremented on each update as part of the distributed transaction involving a quorum of P-replicas). The version number corresponding to the update may be included in the metadata descriptors 120 and in the update notifications, and the DRS 101 at each replica site may be aware of the current version number corresponding to each replica located at that site and the next version number expected. If an update notification with a version number higher than the version number expected is received, the receiving node may in some embodiments send a request for the missing updates to the sender of the update notification: e.g., if the next version expected was version 11, and the update notification is for version 14, the receiving node may send a request for versions 12 and 13 to the sending node. In some embodiments, it may also be possible for a node to receive an update notification with a lower version number than expected, e.g., if the sending node is configured to resend notification messages in response to apparent failures; if a node receives such an update notification with a lower-than-expected version number, the notification may be discarded.

DRS 101 may be configured to maintain a "last coherent timestamp" corresponding to each replica on one embodiment, e.g., to help maintain replica coherency in the event of lost or dropped network packets, temporary network outages, etc. At a node containing a P-replica, the last coherent timestamp value may indicate the last time at which the node participated in a successful update transaction (i.e., an update transaction that was committed). At nodes that contain non-primary replicas, the last coherent timestamp may indicate the last time at which an update notification that resulted in the invalidation or modification of a local replica was received. Whenever a replica is accessed, the last coherent timestamp for the replica may be checked to determine how long it has been since the replica was last known to be coherent (i.e., since the last time the replica was updated or invalidated). If a sufficiently large amount of time (e.g., an interval specified via a configurable parameter) has elapsed since the replica was updated/invalidated, the DRS 101 at the node may force a synchronization of the replica. In some implementations, a timeout mechanism may be used to determine when a specified amount of time has elapsed since the last coherent timestamp changed. In one implementation, the forced synchronization may be accomplished by contacting a quorum of the P-replica sites to check whether the highest version number among those P-replica sites matches the current version number of the local replica. If the local replica has a different current version number than the highest version number of the quorum of P-replica nodes, the local replica may be synchronized with the one of the P-replicas with the highest version number. Depending on the size of the replicated data object and/or the difference in the version numbers, synchronization may involve copying the entire P-replica to the local node, or applying a set of changes for which metadata descriptors 120 are present in the history log of the P-replica nodes with the latest versions. It is noted that the technique of using last coherent timestamps described above may be employed at all the different types of replicas illustrated in FIG. 1 in various embodiments: e.g., at nodes 105 that are configured to store primary replicas 110, local secondary replicas 111, remote replicas 112, and/or remote secondary replicas 113. For example, DRS 101 at a site configured to store an RSR 113 may also utilize a last coherent timestamp and a timeout mechanism to initiate a request to synchronize the local replica with an RR site in its realm 130.

As noted above, due to various reasons such as network or node failures, in some embodiments one or more replica sites may miss an update notification message and therefore "lag behind" the P-replica sites with the latest updates. In one such embodiment, a "lagging replicas list" may be maintained by DRS 101. A particular P-replica node, such as a distributed transaction coordinator (DTC) selected from among the P-replica nodes participating in the synchronous update transaction in the first stage of replication, may be configured to check the list of replicas that participated in the transaction. If one or more P-replica nodes did not participate in the transaction, for example due to failures at those nodes, and instead only a quorum of the nodes participated in the transaction, identifiers of the nodes that were not involved in the transaction may be stored in the lagging replicas list. When any node that is temporarily unavailable (such as one of the lagging replica nodes) rejoins the realm 130, other nodes of the realm may be notified (e.g., by a cluster manager service). The DRS 101 at each notified node may then be configured to consult its lagging replica lists (if it has any such lists) to determine whether a replica at the newly joined node needs to be synchronized. If any synchronizations are needed, in one embodiment the newly joined node may be notified, and the newly joined node may initiate the synchronizations. In other embodiments, a selected P-replica site or a node where a lagging replica list for a given replica is maintained may instead push the latest version of the replicated data object to the newly joined node.

In some embodiments, staged propagation of updates to non-primary replica sites may continue, using the techniques described above, as long as the non-primary replicas are not deleted. A non-primary replica may be deleted in response to a detection by DRS 101 that a locally cached version of the underlying data object is no longer needed at a given node 105, e.g., based on heuristics such as how long it has been since the local replica was last accessed, or in response to a shortage of storage, etc. (Non-primary replicas may also be deleted when the primary replicas are deleted, e.g., in response to a delete request.) When a non-primary replica is deleted, the P-replica sites responsible for propagating updates to that replica may be notified in some implementations, so that further update notifications are no longer sent to the non-primary replica site. In addition, in one embodiment, if a non-primary replica site goes down or fails, and many attempts to send update notifications to that site fail, DRS 101 may be configured to stop sending further update notifications to the failed node, e.g., in response to receiving error messages from a messaging subsystem used for communication with other nodes. When and if the failed non-primary replica site rejoins its realm 130 and the cloud 150, the non-primary replica may be synchronized with a latest version of a P-replica, and update propagations may be resumed in response to new update requests.

Figure 2:
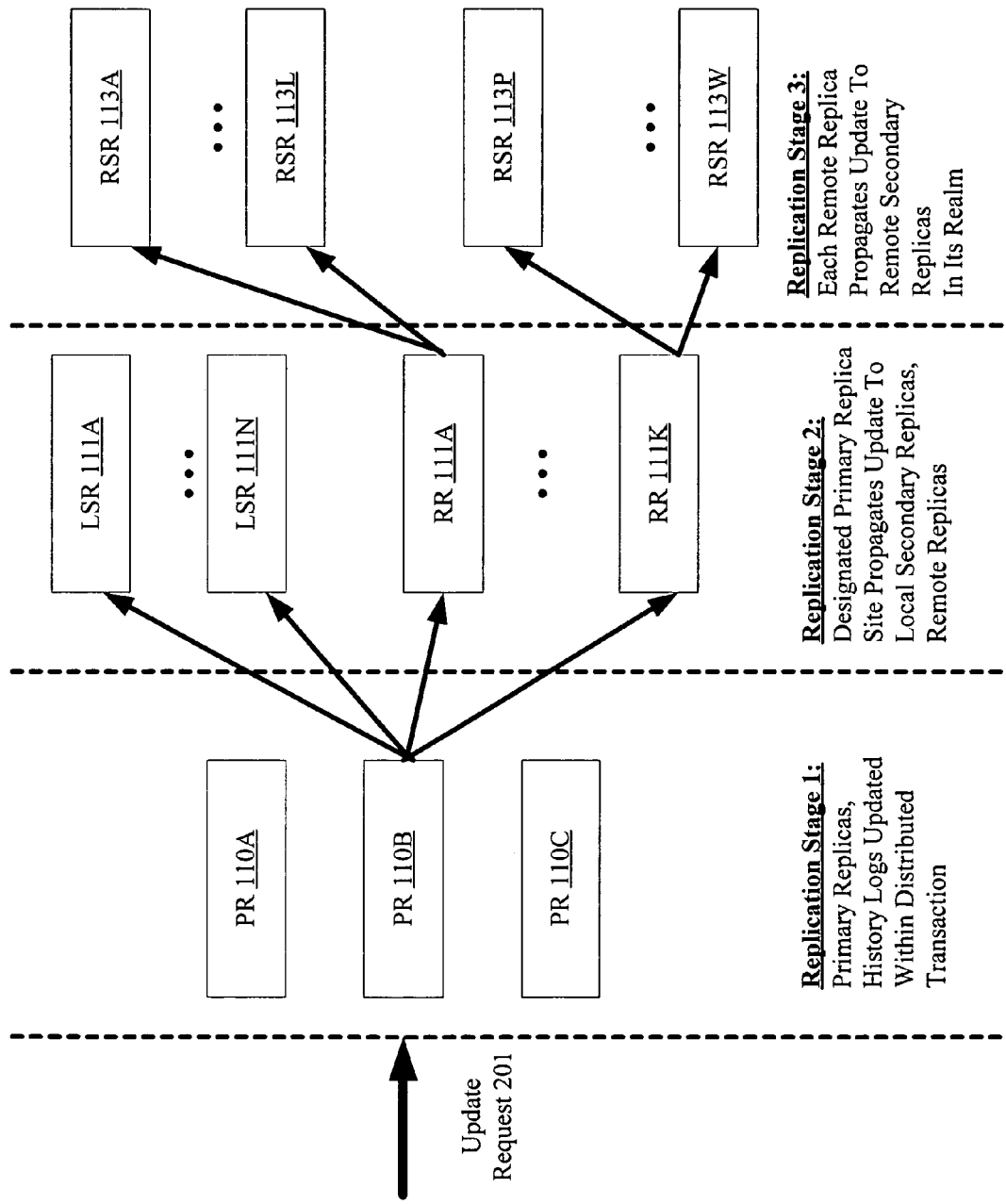
FIG. 2 and FIG. 3 illustrate different exemplary update propagation schemes according to respective embodiments.
Figure 3:
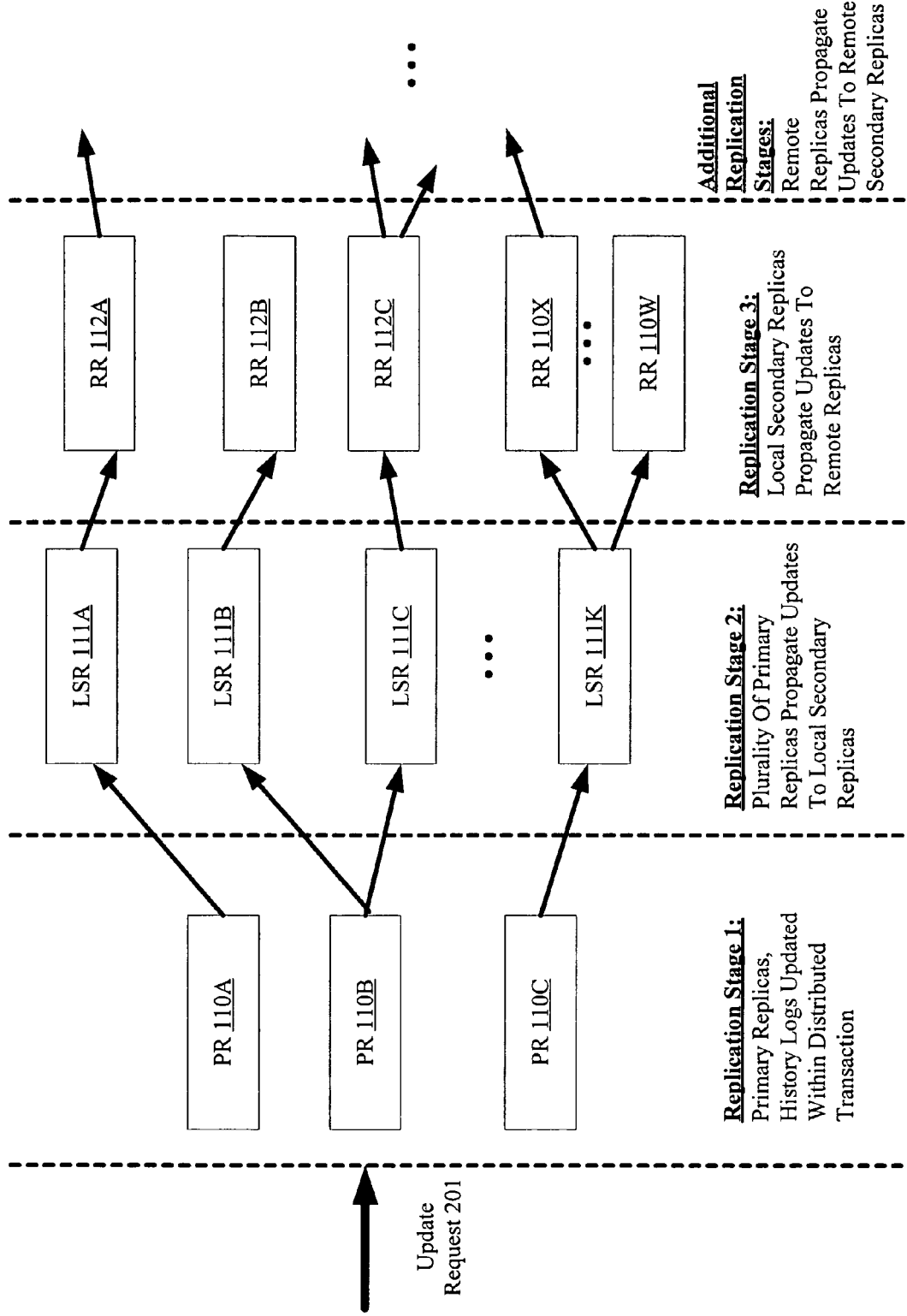

The specific nodes from which update notifications and/or updated data for a given replica is propagated through cloud 150 during a given stage of replication may be selected using a variety of different techniques in different embodiments. FIG. 2 and FIG. 3 illustrate different exemplary update propagation schemes according to respective embodiments. As shown in both FIG. 2 and FIG. 3, a plurality of P-replicas 110A-110C at respective nodes 105 may be updated synchronously within a single distributed transaction in response to an update request 201 in a first stage of replication. In the embodiment illustrated in FIG. 2, a single P-replica 110B site is selected as the source of update notifications and/or modified data sent to a set of LSRs 111 (e.g., LSR 111A-LSR 111N) and to a set of RRs 112 (RR 112A-112K) in a second stage of replication. In turn, in a third stage of replication, each RR 112 site is configured to propagate the update to RSRs within its realm—e.g., RR 112A propagates updates to RSRs 113A-113L in the realm containing RR 112A, and RR 112B propagates updates to RSRs 113P-113W in the realm containing RR 112B. In effect, a single "initiator" site of update notifications is selected within each realm in the embodiment depicted in FIG. 2.

In the embodiment shown in FIG. 3, in contrast, each of several primary replicas 110A, 110B and 110C is the initiator of notification updates to one or more non-primary replica sites: e.g., the node containing P-replica 110A propagates the update to LSR 111A, the node containing P-replica 110B propagates the update to LSR 111B and LSR 111C, and the node containing P-replica 110C propagates the update to LSR 111K in the second stage of replication. In a third stage of replication, the nodes of LSRs 111 in turn propagate the update to RRs 112: e.g., LSR 111A's node propagates the update to RR 112A, LSR 112B's node propagates the update to RR 112B, etc. The nodes of RRs 112 may be responsible for propagating the updates to RSRs 113 in additional replication stages. Thus, FIG. 3 illustrates a more distributed technique for propagating updates from the parent realm 130, in which several different PR nodes share the burden of notifying LSRs, and the LSR nodes in turn share the burden of notifying RRs. In some implementations, DRS 101 at the LSR nodes responsible for update propagation may also be configured to maintain respective history logs 125, so that, for example, an LSR node may use its history log to send an update notification to an RR 112 some time after the LSR node receives its own update notification (i.e., asynchronously with respect to the reception of its own update notification from a PR 110). In other implementations, DRS 101 at LSR nodes may be configured to forward update notifications to RRs 111 synchronously, or as soon the LSRs have been invalidated/updated, and history logs may not be needed at the LSR nodes.

A number of variations and/or combinations of the update propagation techniques shown in FIG. 2 and FIG. 3 may be used in different embodiments. In one embodiment, for example, a hybrid scheme combining aspects of the more centralized technique illustrated in FIG. 2 and the more distributed technique illustrated in FIG. 3 may be used, based on the number of non-primary replicas. For example, if the combined total number of LSR and RR replicas is below a specified threshold (e.g., indicated by a configuration parameter), a single PR site may be designated as initiator of update propagation to all the LSRs and RRs (as in FIG. 2). If the total number of LSRs and RRs increases beyond the threshold, DRS 101 may switch to a more distributed propagation scheme similar to that of FIG. 3, where two or more PR sites are configured to share the work of propagating updates. In some large clouds 150, the DRS 101 may be configured to set up multiple stages of RR replication: e.g., if the cloud comprises a large number of RR sites (where the number may be specified using a configuration parameter), a selected subset of the RR sites may be updated in one stage of replication, and then the updated RR sites may be responsible for further propagating the updates, etc. DRS 101 may be configured to adapt to changing conditions in some embodiments, e.g., as the number of nodes in a realm or in the cloud grows, and modify the specific update propagation technique or algorithms being used as needed to ensure that goals such as avoiding excessive data update and access latency while maintaining high availability continue to be met.

FIG. 4 is a block diagram illustrating exemplary contents of a particular metadata descriptor 120 within a history log 125, according to one embodiment. As shown, the descriptor 120 may comprise a transaction identifier 405 corresponding to the distributed transaction in which the P-replicas are modified, a data object version number 410 corresponding to the update, intent information 415 descriptive of the update (e.g., for a file modification, the offset within the file at which the updated blocks start and the number of blocks or bytes updated/deleted/added; for a directory update, the directory blocks modified, etc.), and optional additional metadata/statistics 420 (e.g., a timestamp of when the update occurred, an identification of the user that requested the update, etc.). One or more of the fields (e.g., additional metadata field 420) shown in FIG. 4 may be omitted in some embodiments.

As described above, contents of the metadata descriptors 120 may be used to generate update notifications sent to nodes where additional replicas of the same data object are stored in some embodiments. In one embodiment, the history logs 125 may be implemented as fixed-size rolling buffers in persistent, non-shared storage (e.g., a history log may be stored on a device that is accessible from only one node 105). When such a fixed-size history log 125 fills up, the earliest entries in the log may be overwritten when new client update requests are received. In such embodiments, it may be possible that a descriptor 120 may be overwritten in the history log before update notifications corresponding to the descriptor are sent to (or successfully received at) one or more of the replica sites that were not included in the original transaction. Such overwriting may occur, for example, during periods of bursty updates, when the network is excessively congested and packets are lost, and/or when the P-replica initiator node is temporarily too busy with other tasks to send update notifications fast enough. DRS 101 may be configured to handle such occurrences of lost update metadata descriptors using a number of different techniques in various embodiments. For example, in one embodiment, if the lagging replica is a primary replica 110, it may be synchronized with the primary replicas that have the latest committed versions, using either a full synchronization algorithm (e.g., by copying the entire P-replica) or an incremental synchronization mechanism (e.g., using a utility such as "rsync"). If the lagging replica is not a primary replica, the lagging replica may simply be deleted (since it can be recreated on demand just as it was initially created, e.g., whenever an access request directed at the underlying data object is received). Alternatively, in some embodiments, if the non-primary replica is implemented as a sparse replica, the metadata for the non-primary replica may be retained while the data blocks may be deleted.

FIG. 5 is a block diagram illustrating various replica attributes 505 for which values may be maintained at each node that stores a replica, according to one embodiment. As noted above, a single global name space may be implemented for the data objects managed in system 100, so that, for example, a particular file or directory may be accessed seamlessly from any node 105 using the same identifier. A unique object identifier 510 may be generated for each data object created in the system and may be included among the attributes associated with each replica of the data object. Attributes 505 may also include indication of the specific type or role 515 of the replica—e.g., whether the replica is a primary replica (PR) 110, a local secondary replica (LSR) 111, a remote replica (RR) 112, or a remote secondary replica (RSR) 113. Identifiers 520 for parent and sibling replica nodes may also be stored in some embodiments: e.g., for a given P-replica, node identifiers for other P-replica sites, LSR sites and/or any RR sites to which update notifications have to be sent from the P-replica may be stored, and for a non-primary replica, node identifiers of P-replica nodes from which update notifications may be expected may be stored. A last coherent timestamp value 525, which may be used to pull updates that may have been missed as described above, may also be stored as an attribute of a given replica in some embodiments. In addition, for example for a given P-replica, a list of lagging replicas 530 may be maintained as an attribute and used as described earlier to synchronize nodes that may not have been able to participate in update transactions.

Figure 6:
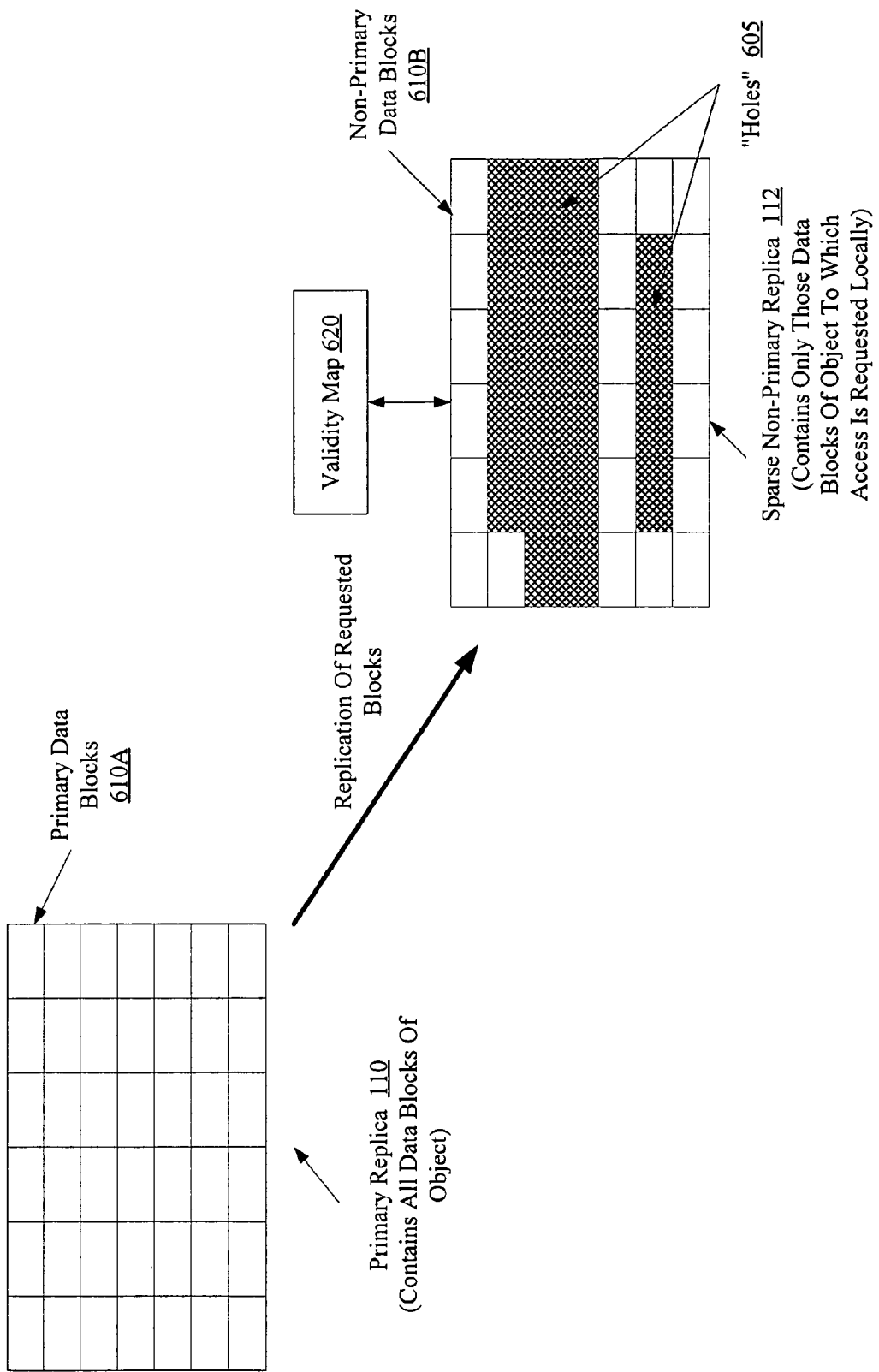
FIG. 6 is a block diagram illustrating an example of a full primary replica and a corresponding sparse remote replica, according to one embodiment.

As noted earlier, in some embodiments, non-primary replicas may not contain replicas of all the data blocks of the underlying data objects, and such non-primary replicas may be referred to as sparse replicas. FIG. 6 is a block diagram illustrating an example of a full primary replica 110 and a corresponding sparse remote replica 112, according to one embodiment. As shown, the full replica 110 contains primary copies of each block of the data object, which may be termed primary data blocks 610A. The remote replica 112 may be created when a request to access one or more specific blocks of the underlying data object are received at a node 105 that is not part of the parent realm 130 for the data object. Copies of the specific data blocks requested (which may be termed non-primary data blocks 610B) may be created in the sparse remote replica 112. Blocks of the data object for which requests are not received may not be replicated in the sparse replica; thus, the sparse replica may be an incomplete copy of the underlying data object, as indicated by the "holes" 605 corresponding to the unreplicated blocks.

A validity map 620 may be used to distinguish between the replicated data blocks 610B and the holes 605 in some embodiments. The validity map may be implemented, for example, as a bit map, where each bit represents a specified amount of data, with the bits corresponding to the replicated data blocks being set to "1" and the bits corresponding to the unreplicated data blocks being set to "0". Validity map 620 may be implemented as an extended attribute of a file used to store the sparse replica in some embodiments, and may be stored as the first few kilobytes of the file in other embodiments. When an update notification that includes update intent information but does not include the updated data blocks is received at a node hosting a remote replica 112, the validity map 620 may be quickly modified to indicate that the local versions of the updated bocks are no longer valid. When the updated data blocks are eventually received, the remote replica 112 may be updated and the validity map may be modified to indicate that the local copies of the blocks are again valid. When a node 105 that hosts a sparse replica receives a request to access a data block that is not currently part of the sparse replica (i.e., when a request attempts to access a data block that corresponds to a hole 605), a request to obtain the data block may be sent to a selected P-replica host for the underlying data object. In some embodiments, e.g., in order to prevent duplicate requests for the same data blocks, a list of currently-requested blocks may also be maintained at each node 105 by DRS 101. Thus, the data content of sparse replicas may change over time—e.g., as more read requests are received locally, more blocks may be locally replicated, and the holes may shrink; in contrast, if update notifications are received for data blocks that are no longer accessed, data blocks replicated earlier may be invalidated and the holes may expand.

Sparse remote replicas may be created in response to read requests received at nodes that do not store P-replicas, as described above. The processing of update or write requests received at such non-primary replica nodes may differ in various embodiments. In some embodiments, for example, write requests received at nodes that are not P-replica sites may be handled by forwarding the write requests to P-replica nodes. In one embodiment, writeable replicas may be maintained at one or more nodes that do not store primary replicas, so that, for example, update requests may be allowed to complete without requiring the distributed update transaction involving multiple P-replica sites to be completed synchronously, and P-replicas may later be updated asynchronously. In such an embodiment, various techniques may be used to ensure that concurrent updates from multiple nodes do not lead to data inconsistency. In some embodiments, if more and more of the update requests directed at a given data object are received in a particular realm that is not the current parent realm for the data object, the data object may be "migrated" to the particular realm: e.g., the original P-replica sites for the data object may be decommissioned and new P-replica sites may be selected in the particular realm where most of the updates are requested, and the particular realm may be designated the new parent realm for the data object.

Figure 7:
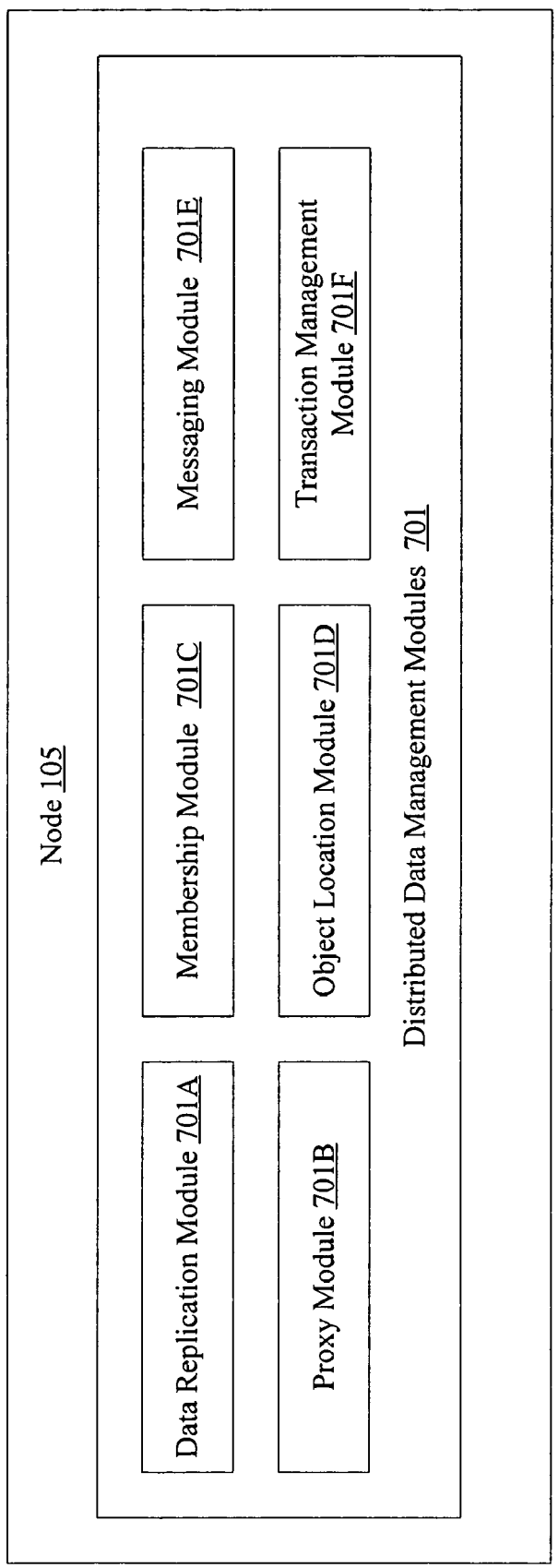
FIG. 7 is a block diagram illustrating a node configured to execute various modules of such a distributed data management system, according to one embodiment.

In one embodiment, the DRS 101 may be part of a more general distributed data management system, which may include a variety of other services such as data object location and discovery services. FIG. 7 is a block diagram illustrating a node 105 configured to execute various modules 701 of such a distributed data management system, according to one embodiment. As shown, modules 701 include a data replication module 701A, proxy module 701B, membership module 701C, object location module 701D, messaging module 701E, and transaction management module 701F. Other modules (e.g., administration modules) may also be included at each node to implement the distributed data management system in various embodiments.

In the embodiment of FIG. 7, DRS 101 may comprise the aggregation of data replication modules 701A at each of the nodes 105 of the cloud 150. The data replication module 701A at a given node 105 may be responsible for maintaining local replicas and coordinating replica coherency operations with other data replication modules at other nodes. In one embodiment, a local replica service subcomponent of data replication module 701A may be responsible for storing individual replicas (e.g., both full and sparse replicas) as local files in an underlying file system (such as the VxFS file system from VERITAS Corporation). The local replica service may also be responsible for maintaining the history logs 125, as well as for other tasks such as implementing mappings between object identifiers and local file metadata such as inode numbers. The individual replicas as well as the history logs may be stored on devices that are not shared by different nodes 105 in some embodiments: e.g., the nodes 105 may implement a loosely-coupled or "shared-nothing" cluster architecture, where neither volatile memory nor persistent storage devices are accessible from more than one node. A replica allocation subcomponent of data replication module may be responsible for identifying nodes 105 at which replicas of a given data object should be stored. A coherency subcomponent of data replication module may be configured to detect differences in version numbers between a local replica and other replicas (indicating inconsistencies between the replicas that may have resulted from dropped packets, node failures, etc.) and to initiate operations to synchronize the local replica with other replicas as needed, e.g., using a last coherent timestamp 520 and/or lagging replicas lists 530.

Proxy module 701B may be responsible for presenting a root directory for replicated data objects as a local file system at node 105. The proxy module may be implemented, for example, as a file system kernel driver, and may also be responsible for local caching of file data, e.g., in a page cache or on local disk, and/or for aggregating or combining delayed writes received at a given node 105 from a P-replica node. Standard file systems calls such as open( ), read( ), write( ), mkdir( ), stat( ) etc. may be supported by the proxy module. Membership module 701C may be configured to maintain cloud and realm membership information, e.g., to perform automated discovery to identify nodes 105 that have joined or rejoined a realm, to implement heartbeat mechanisms to detect node failures, etc. Object location module 701D may be configured to store information about the locations of various types of replicas—for example, non-primary replica sites to which update notifications are to be sent from a given node 105 may be identified by querying the object location module 701D at the node. It is noted that in some embodiments, hints indicating the physical location of a replica may be included within the name or identifier of the replica, and in such embodiments object location module 701D may not always have to be queried to determine the physical location of one or more replicas. Messaging module 701E may provide messaging services used by other modules 701 to contact peer modules at other nodes. For example, in one implementation, messaging module 701E may support one-way and two-way asynchronous and/or synchronous messaging, as well as broadcast messages from one node to other nodes within the node's realm. In some embodiments, messaging module 701E may be configured to establish TCP/IP connections to other nodes for transmitting messages between other peer modules 701, and the TCP/IP connections may be kept open to avoid the overhead of establishing a new connection for every message. Transaction management module 701F may be responsible for managing update transactions, e.g., using a quorum-based two-phase commit protocol in some embodiments. When an update request is received, one P-replica site may be selected as a distributed transaction coordinator (DTC) for the corresponding update transaction. The DTC may attempt to include all the P-replica sites for the object in the update transaction; however, even if one or more of the P-replica sites are down, the transaction may be committed if a quorum or majority of the P-replica sites participate. If a quorum of the P-replica nodes is not available, the transaction may be aborted, and an error indication may be sent to the client that requested the update.

Figure 8:
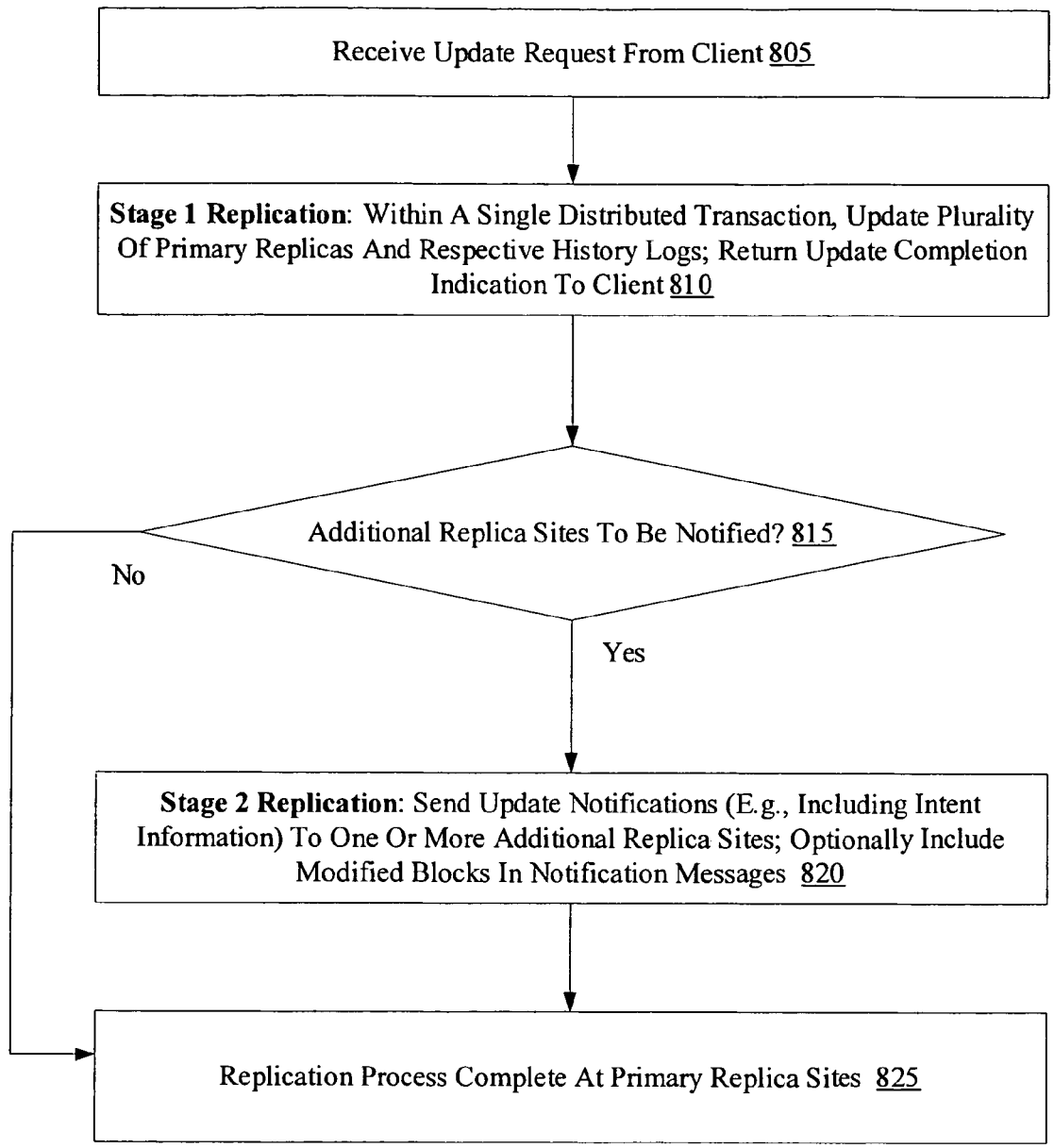
FIG. 8 is a flow diagram illustrating aspects of the operation of a data replication service 101, according to one embodiment.

FIG. 8 is a flow diagram illustrating aspects of the operation of DRS 101, according to one embodiment. A request to update a given data object on behalf of a client may be received at a node 105 where a P-replica of the object is stored, as shown in block 805 of FIG. 8. The request may be received directly from a client at the P-replica node, or, if the update request is received initially at a node that does not store a P-replica, the update request may be relayed to the P-replica node from the receiving node. Update requests may be received directly from users via a web-based user interface, other graphical user interfaces or GUIs, command line interfaces etc., in various embodiments, or from various applications such as e-mail servers, database management systems, backup/restore applications, etc. In response to the request, DRS 101 may be configured to perform a synchronous first stage of replication (block 810), in which a plurality of P-replicas may be updated and corresponding metadata entries 120 may be created in history logs 125 within a single distributed transaction. One of the P-replica nodes may be chosen as a coordinator of the distributed transaction, and the coordinator may attempt to include all the P-replica sites in the transaction. An update completion indication may be returned to the client if at least a quorum of P-replica sites participate in the transaction. After the update completion indication has been sent to the client, DRS 101 may be configured to determine whether any additional nodes with replicas of the data object need to be notified of the update (decision block 815). If no additional nodes need to be notified—e.g., if the only replicas are P-replicas, and all P-replica sites participated in the update transaction, the replication process may be complete (block 825). If, however, one or more additional replica sites have to be notified, a second, asynchronous stage of replication may be initiated (block 820), in which the additional replica sites are notified of the update. The update notifications may include, for example, intent information such as an offset at which a modification was made to a file and an indication of the number of bytes or blocks that were modified at that offset. In some embodiments, modified blocks of the data object may also be included in the update notifications, e.g., if the amount of data updated or added is below a configurable threshold amount. Additional stages of replication, not shown in FIG. 8, may follow the second stage in some embodiments, in which nodes receiving the update notifications during the second stage may further propagate update notifications to other non-primary replica sites.

Figure 9:
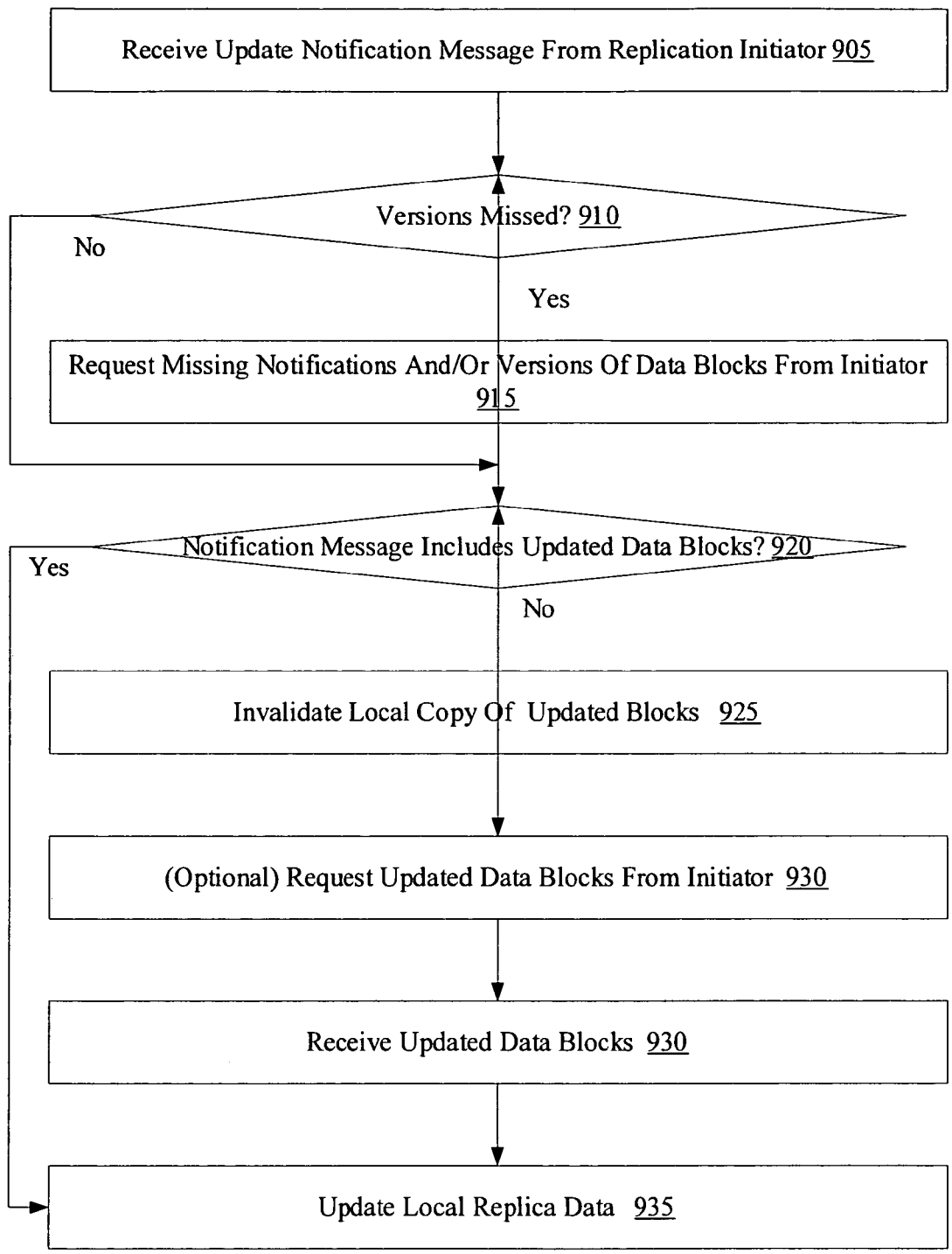
FIG. 9 is a flow diagram illustrating aspects of the operation of a data replication service in response to receiving an update notification, according to one embodiment.

FIG. 9 is a flow diagram illustrating further aspects of the DRS 101 in response to receiving an update notification, according to one embodiment. An update notification message from an initiator (such as a P-replica node) may be received at a node that is configured to store a non-primary replica, such as a remote replica (RR) 112, a local secondary replica (LSR) 111, or a remote secondary replica (RSR) 113 (block 905 of FIG. 9). The update notification message may include a version number corresponding to the update. As described earlier, DRS 101 at each node 105 may be configured to determine, based on the current version number of its local replica, a version number to be expected next: e.g., if version numbers are incremented on each update in a given implementation, and the current version number of a remote replica at a given node is 14, the next version number expected in an update notification may be 15. If the version number in the update notification indicates that one or more versions were missed or lost (as detected in decision block 910), the receiving node may send a request to the initiator for the missing update notifications and/or the updated data corresponding to the missing update notifications (block 915). For example, in the scenario described above where the current version number of an RR is 14, missing versions may be detected if the version number in the update notification is 16 or higher. If the update notification message included all of the modified data blocks (as detected in decision block 920), the local replica may be updated accordingly (block 935). If the update notification messages does not include all the modified data blocks, but does include intent metadata describing which blocks were updated, the portion of the local replica corresponding to the updated blocks may be invalidated (block 925), e.g., using validity map 620 shown in FIG. 6. Optionally, in some embodiments, a request for the updated data blocks may be sent to the initiator (block 930). When modified data blocks are eventually received (block 935), either in response to a data pull request from the non-primary replica node or as a result of a data push from the initiator, the local replica may be updated (block 940).

It is noted that the operations similar to those illustrated in FIG. 9 may be performed at a node containing any of the various types of replicas: e.g., at a node containing an RR in response to an update notification from a PR or an LSR, at a node containing an LSR in response to an update notification from a PR, or at a node containing an RSR in response to an update notification from an RR. In some embodiments, the operations of FIG. 9 may even be performed at a node containing a PR that did not participate in an update transaction (i.e., at a PR node that was not part of a quorum) in response to an update notification from another node containing a PR that did participate in an update transaction. In embodiments employing more than two stages of replication, operations similar to those of FIG. 9 may be performed during any stage of replication other than the synchronous first stage.

It is noted that while the techniques of multi-stage replication have been described above in the context of a hierarchical distributed data management system comprising individual nodes aggregated into realms and realms aggregated into clouds, similar techniques may be used in any distributed data management system, including for example systems that are not organized as hierarchies. Any of a variety of data object types may be replicated using the above techniques in various embodiments: e.g., objects such as files, directories, and symbolic links may be replicated in a distributed file system environment; database objects such as records, tables or indexes may be replicated in a distributed database environment; raw data blocks may be replicated in a distributed volume manager environment, and so on. Loosely-coupled multi-stage replication techniques such as those described above may be used to support any of a variety of different storage management applications in different embodiments, such as a large-scale distributed file system, a multi-tier backup architecture, etc. The replica sites at the different stages of replication may comprise any desired types of storage platforms, including, for example, computer servers with locally-attached storage, intelligent storage devices such as advanced disk arrays, storage appliances or switches, object-based storage devices, etc.

Figure 10:
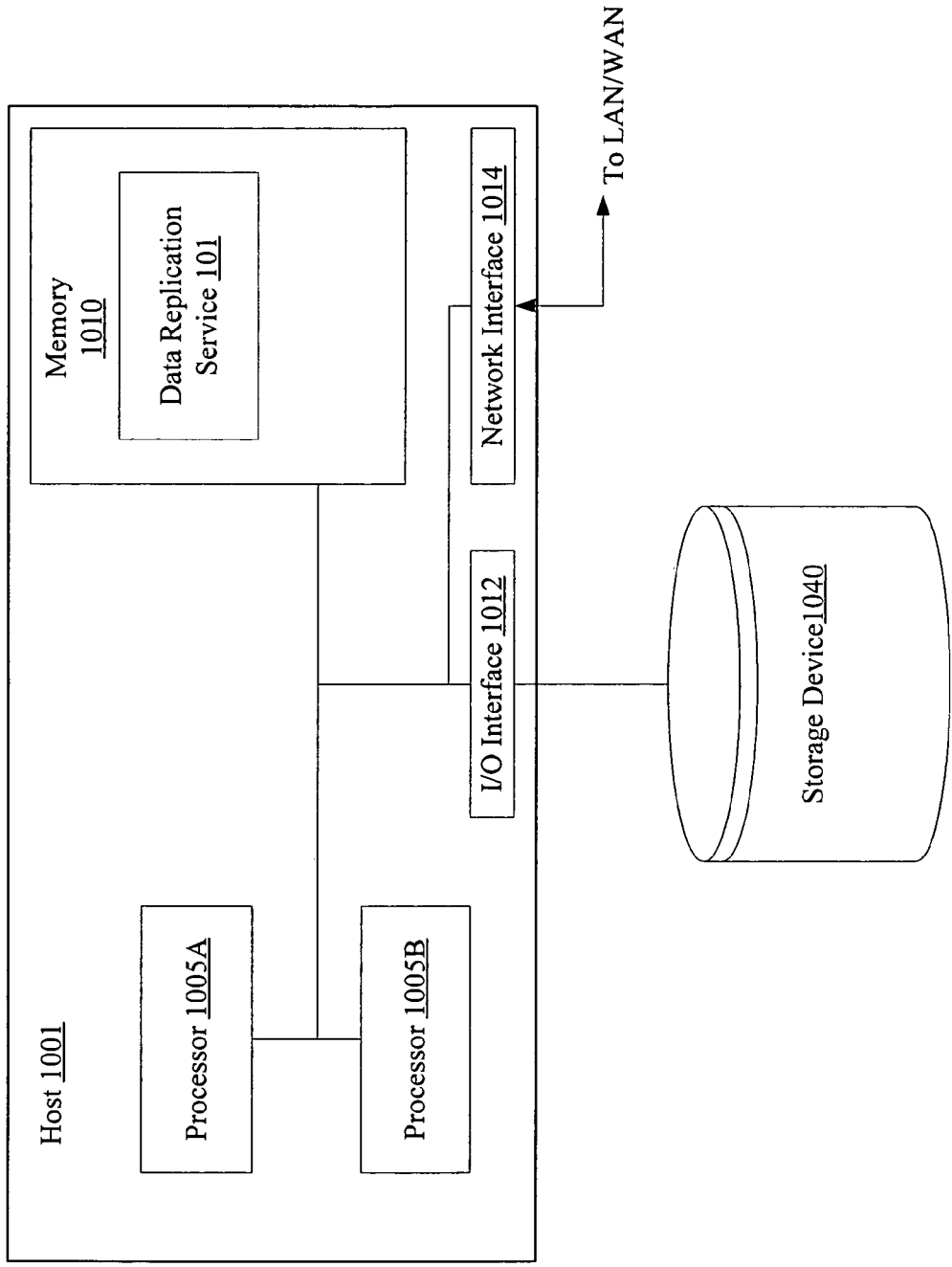
FIG. 10 is a block diagram illustrating constituent elements of a computer host, according to one embodiment.

FIG. 10 is a block diagram of a computer host 1001 that may be deployed as a node 105, according to one embodiment. As shown, host 1001 may include one or more processors 1005, such as processors 1005A and 1005B. In various embodiments, processors 1005 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of data replication service 101 or any of the components 701 of distribute data management system may be partly or fully resident within a memory 1010 at a given point in time, and may also be stored on a storage device 1040. Memory 1010 may be implemented using any appropriate medium such as any of various types of RAM (e.g., DRAM, SDRAM, RDRAM, SRAM, etc.). In addition to processors 1005 and memory 1010, host 1001 may also include one or more I/O interfaces 1012 providing access to storage devices 1040, one or more network interfaces 1014 providing access to a network such as a LAN 106 or WAN 107, interfaces to display devices (not shown), and the like. Any of a variety of storage devices 1040 may be used to store the instructions as well as data for DRS 101 or components 701 in different embodiments, include any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 1040 may be directly coupled to host 1001 in some embodiments (e.g., using the Small Computer Systems Interface (SCSI) protocol), or may be accessible over any desired storage interconnect such as a fiber channel fabric or storage area network (SAN) in other embodiments. As noted earlier, at least some of the storage devices 1040 may be accessible from no more than one node 105 in some embodiments.

In addition to DRS 101 and components 701, memory 1010 and/or storage devices 1040 may also store operating systems software and/or software for various applications in various embodiments. In some embodiments, DRS 101 may be included within a distributed operating system, a storage management software product or another software package, while in other embodiments, DRS 101 may be packaged as a standalone product. In some embodiments, part or all of the functionality of DRS 101 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
one or more processors; and
memory storing program instructions executable by the one or more processors to implement a data replication service configured to:
in response to an update request directed at a data object that includes a plurality of data blocks,
update a respective replica of the data object at each primary replica site of a plurality of primary replica sites of the data object, wherein the respective replica includes a respective copy of the data blocks of the data object, wherein updating the respective replica comprises changing data of two or more of the data blocks in the respective copy of the data blocks, wherein the data replication service is configured to update the replicas at the plurality of primary replica sites synchronously with respect to the update request;
store metadata specifying which data blocks were changed by the update at each primary replica site of the plurality of primary replica sites;
in response to determining that a notification of the update is to be sent to a particular additional replica site, send the metadata specifying which data blocks were changed by the update in a notification to the particular additional replica site, wherein the notification does not include the data of the data blocks changed by the update; and
in response to receiving the notification at the particular additional replica site, use the metadata to determine which data blocks were changed by the update, and mark each of the data blocks changed by the update as invalid in an additional replica of the data object at the particular additional replica site, wherein the data replication service is configured to mark the data blocks changed by the update as invalid in the additional replica asynchronously with respect to the update request.

2. The system as recited in claim 1, wherein the data replication service is configured to update the respective replicas at the plurality of primary replica sites within a single transaction, and send the notification to the particular additional replica site after the single transaction is completed.

3. The system as recited in claim 1, wherein the update request is received from a client, wherein the data replication service is configured to update the respective replicas and to store the metadata before sending an indication of an update completion to the client, wherein the notification of the update is sent to the particular additional replica site after the indication of the update completion is sent to the client.

4. The system as recited in claim 1, wherein the data replication service is configured to:
designate a set of two or more nodes of a distributed network of nodes as primary replica sites for the data object, wherein the nodes of the set are linked via a local area network (LAN), wherein the plurality of primary replica sites comprises a quorum of the set.

5. The system as recited in claim 1, wherein the particular additional replica site is linked to the particular primary replica site via a wide area network (WAN).

6. The system as recited in claim 1, wherein the particular additional replica site is a first additional replica site, wherein the notification is a first notification, wherein the data replication service is further configured to:
in response to determining that a notification of the update is to be sent to a second additional replica site, send the data of the data blocks changed by the update in a second notification to the second additional replica site.

7. The system as recited in claim 6, wherein, in response to receiving the second notification including the data of the data blocks changed by the update at the second additional replica site, the data replication service is further configured to store the data of the data blocks changed by the update in a locally cached version of the data object at the second additional replica site.

8. The system as recited in claim 1, wherein the data replication service is further configured to include a version number of the data object in the notification sent to the particular additional replica site.

9. The system as recited in claim 1, wherein, in response to receiving the notification at the particular additional replica site, the data replication service is configured to:
send a request to a particular primary replica site to retrieve the data of the data blocks changed by the update.

10. The system as recited in claim 1, wherein the data replication service is configured to use a configurable parameter to determine whether the notification should include the data of the data blocks changed by the update.

11. The system as recited in claim 1, wherein the data replication service is further configured to:
maintain a respective latest coherent timestamp associated with the data object at each replica site of the plurality of primary replica sites and the additional replica site, wherein the latest coherent timestamp at a given replica site indicates a latest point in time at which an indication of an update to the data object was received at the site, and
determine, using the respective latest coherent timestamp at a respective replica site, whether a local replica of the data object at the respective replica site is to be synchronized with another replica at another replica site.

12. The system as recited in claim 1, wherein the additional replica of the data object at the particular additional replica site is a sparse replica of the data object, wherein the sparse replica does not include at least one data block of the plurality of data blocks of the data object.

13. A tangible, computer readable medium comprising program instructions, wherein the instructions are computer-executable to implement a data replication service configured to:
in response to an update request directed at a data object that includes a plurality of data blocks,
update a respective replica of the data object at each primary replica site of a plurality of primary replica sites of the data object, wherein the respective replica includes a respective copy of the data blocks of the data object, wherein updating the respective replica comprises changing data of two or more of the data blocks in the respective copy of the data blocks wherein the data replication service is configured to update the replicas at the plurality of primary replica sites synchronously with respect to the update request;
store metadata specifying which data blocks were changed by the update at each primary replica site of the plurality of primary replica sites;
in response to determining that a notification of the update is to be sent to a particular additional replica site, send the metadata specifying which data blocks were changed by the update in a notification to the particular additional replica site, wherein the notification does not include the data of the data blocks changed by the update; and
in response to receiving the notification at the particular additional replica site, use the metadata to determine which data blocks were changed by the update, and mark each of the data blocks changed by the update as invalid in an additional replica of the data object at the particular additional replica site, wherein the data replication service is configured to mark the data blocks changed by the update as invalid in the additional replica asynchronously with respect to the update request.

14. The computer readable medium as recited in claim 13, wherein the data replication service is configured to update the respective replicas at the plurality of primary replica sites within a single transaction, and send the notification to the particular additional replica site after the single transaction is completed.

15. The computer readable medium as recited in claim 13, wherein the update request is received from a client, wherein the data replication service is configured to update the respective replicas and to store the metadata before sending an indication of an update completion to the client, wherein the notification of the update is sent to the particular additional replica site after the indication of the update completion is sent to the client.

16. The computer readable medium as recited in claim 13, wherein the data replication service is further configured to:
determine, based on a value of a configurable parameter, whether the notification sent to the particular additional replica site should include the data of the data blocks changed by the update.

17. The computer readable medium as recited in claim 13, wherein the data replication service is further configured to include a version number of the data object in the notification sent to the particular additional replica site.

18. The computer readable medium as recited in claim 13, wherein, in response to receiving the notification at the particular additional replica site, the data replication service is configured to:
send a request to a particular primary replica site to retrieve the data of the data blocks changed by the update.

19. A method comprising:
updating a respective replica of a data object at each primary replica site of a plurality of primary replica sites of the data object in response to receiving an update request directed at the data object, wherein the respective replica includes a respective copy of a plurality of data blocks of the data object, wherein updating the respective replica comprises changing data of two or more of the data blocks in the respective copy of the data blocks, wherein the replicas at the plurality of primary replica sites are updated synchronously with respect to the update request;
storing metadata specifying which data blocks were changed by the update at each primary replica site of the plurality of primary replica sites;
in response to determining that a notification of the update is to be sent to a particular additional replica site, sending the metadata specifying which data blocks were changed by the update in a notification to the particular additional replica site, wherein the notification does not include the data of the data blocks changed by the update; and
in response to receiving the notification at the particular additional replica site, using the metadata to determine which data blocks were changed by the update, and marking each of the data blocks changed by the update as invalid in an additional replica of the data object at the particular additional replica site, wherein the data blocks changed by the update are marked as invalid in the additional replica asynchronously with respect to the update request.

20. The method as recited in claim 19, wherein the respective replicas are updated at the plurality of primary replica sites within a single transaction, and wherein the notification is sent to the particular additional replica site after the single transaction is completed.

21. The method as recited in claim 19, wherein the update request is received from a client, further comprising:

sending an indication of an update completion to the client, wherein the update completion indication is sent to the client after updating the respective replicas and storing the metadata and before sending the notification of the update to the particular additional replica site.

22. The method as recited in claim 19, further comprising:

determining, based on a value of a configurable parameter, whether to include the data of the data blocks changed by the update in the notification sent to the particular additional replica site.

23. The method as recited in claim 19, wherein the notification sent to the particular additional replica site also includes a version number of the data object.

24. The method as recited in claim 19, further comprising:

in response to receiving the notification at the particular additional replica site, sending a request to a particular primary replica site to retrieve the data of the data blocks changed by the update.

25. The system of claim 1, wherein the notification is sent to the particular additional replica site asynchronously with respect to the update request.

26. A system, comprising:

a plurality of primary replica nodes; and an additional replica node;

wherein, in response to a request to update two or more data blocks of a plurality of data blocks of a data object, each respective primary replica node of the plurality of primary replica nodes is configured to update a respective replica of the data object stored at the respective primary replica node by changing data of the two or more data blocks in the respective replica of the data object synchronously with respect to the request;

wherein one or more primary replica nodes of the plurality of primary replica nodes are configured to store metadata specifying which data blocks were changed in response to the request;

wherein the plurality of primary replica nodes includes a particular primary replica node configured to send the metadata specifying which data blocks were changed in a notification to the additional replica node, wherein the notification does not include the data of the data blocks that were changed; and wherein, in response to receiving the notification, the additional replica node is configured to use the metadata to determine which data blocks were changed, and mark each of the changed data blocks as invalid in an additional replica of the data object stored at the additional replica node, wherein the additional replica node is configured to mark the changed data blocks as invalid in the additional replica asynchronously with respect to the request.

* * * * *